(12) United States Patent
Khoshkava et al.

(10) Patent No.: US 10,404,149 B2
(45) Date of Patent: Sep. 3, 2019

(54) ELECTROMAGNETIC HAPTIC ACTUATOR WITH HIGH DEFINITION CAPABILITY

(71) Applicant: Immersion Corporation, San Jose, CA (US)

(72) Inventors: Vahid Khoshkava, Montreal (CA); Mansoor Alghooneh, Montreal (CA); Neil T Olien, Montreal (CA)

(73) Assignee: IMMERSION CORPORATION, San Jose, CA (US)

( * ) Notice: Subject to any disclaimer, the term of this patent is extended or adjusted under 35 U.S.C. 154(b) by 471 days.

(21) Appl. No.: 15/342,743

(22) Filed: Nov. 3, 2016

(65) Prior Publication Data

US 2018/0123437 A1 May 3, 2018

(51) Int. Cl.
*H02K 33/12* (2006.01)
*H02K 1/34* (2006.01)
(Continued)

(52) U.S. Cl.
CPC ............. *H02K 33/12* (2013.01); *G06F 3/016* (2013.01); *H02K 1/12* (2013.01); *H02K 1/34* (2013.01);
(Continued)

(58) Field of Classification Search
CPC ............ H02K 33/12; H02K 1/34; H02K 1/12; H02K 33/00; H02K 3/04; H02K 33/16;
(Continued)

(56) References Cited

U.S. PATENT DOCUMENTS

2016/0126821 A1 5/2016 Iwaki et al.
2016/0336842 A1* 11/2016 Chun ............... H02K 33/02
2017/0120297 A1 5/2017 Chun

FOREIGN PATENT DOCUMENTS

WO 2012/053865 A2 4/2012
WO 2013/069148 A1 5/2013
WO 2016/010180 A1 1/2016

OTHER PUBLICATIONS

Communication under Rule 71(3) EPC dated Jan. 24, 2019 in European Application No. 17199675.4.
(Continued)

*Primary Examiner* — Thomas Truong
(74) *Attorney, Agent, or Firm* — Medler Ferro Woodhouse & Mills PLLC

(57) ABSTRACT

A haptic actuator having a housing, a moveable mass, and first, second, and third electromagnets is disclosed. The first electromagnet is fixed to the housing. The moveable mass is suspended in the housing and at least partially surrounding the first electromagnet. The moveable mass has ferromagnetic material at a first end of the moveable mass, and ferromagnetic material at a second end opposite the first end. It further has a plurality of permanent magnets that are configured to magnetize the ferromagnetic material, such that when a current is applied to the first electromagnet, the ferromagnetic material of one of the first and second ends is attracted to the first electromagnet, and the ferromagnetic material of the other of the first and second ends is repelled. The second electromagnet and the third electromagnet are each fixed to the housing, and face opposite ends of the moveable mass.

16 Claims, 9 Drawing Sheets

(51) Int. Cl.
*H02P 25/032* (2016.01)
*H02K 1/12* (2006.01)
*H02K 3/04* (2006.01)
*G06F 3/01* (2006.01)
*H02K 33/00* (2006.01)

(52) U.S. Cl.
CPC ............... *H02K 3/04* (2013.01); *H02K 33/00* (2013.01); *H02P 25/032* (2016.02)

(58) Field of Classification Search
CPC ......... H02K 33/14; H02K 35/00–33/18; H02P 25/032; G06F 3/016
USPC ..................................................... 310/15–39
See application file for complete search history.

(56) References Cited

OTHER PUBLICATIONS

Extended European Search Report (EESR) for EP Appl. No. 17199675 dated Feb. 2018.

* cited by examiner

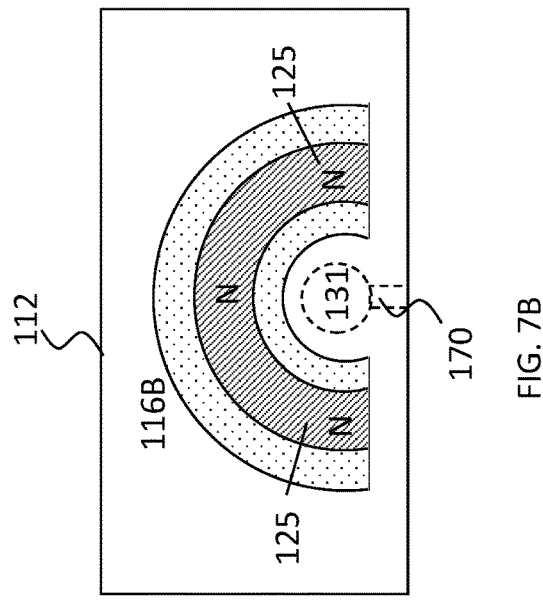
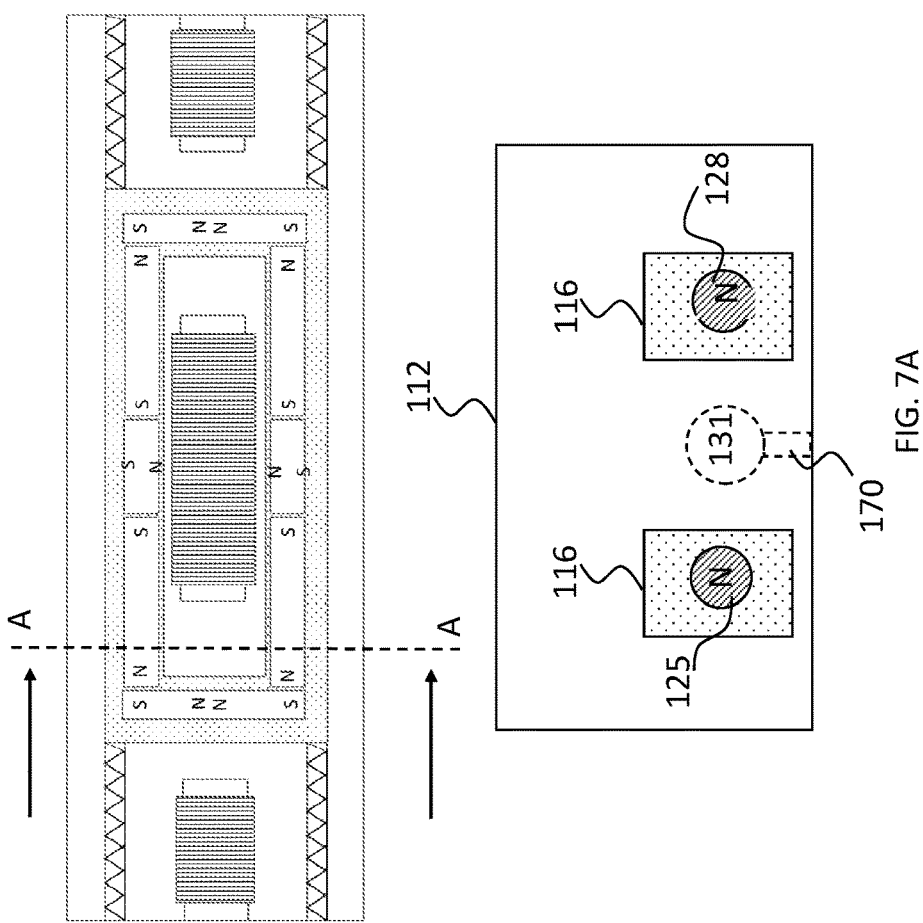
FIG. 7A
FIG. 7B

ELECTROMAGNETIC HAPTIC ACTUATOR WITH HIGH DEFINITION CAPABILITY

FIELD OF THE INVENTION

The present invention is directed to an electromagnetic haptic actuator that has application in user interfaces, gaming, automotive, wearables, and consumer electronics.

BACKGROUND

Electronic device manufacturers strive to produce a rich interface for users. Conventional devices use visual and auditory cues to provide feedback to a user. In some interface devices, kinesthetic feedback (such as active and resistive force feedback) and/or tactile feedback (such as vibration, texture, and heat) is also provided to the user, and may be examples of haptic feedback, or more generally haptic effects. Haptic feedback can provide cues that enhance and simplify the user experience using the user interface. Specifically, vibration effects, or vibrotactile haptic effects, may be useful in providing cues to users of electronic devices to alert the user to specific events, or provide realistic feedback to create greater sensory immersion within a simulated or virtual environment.

Haptic feedback has also been increasingly incorporated in portable electronic devices, such as cellular telephones, personal digital assistants ("PDAs"), portable gaming devices or game controllers, computer tablets, and a variety of other portable electronic devices. Additionally, devices such as cellular telephones and PDAs are capable of providing various alerts to users by way of vibrations. For example, a cellular telephone can alert a user to an incoming telephone call by vibrating. Similarly, a PDA can alert a user to a scheduled calendar item or provide a user with a reminder for a "to do" list item or calendar appointment.

In order to generate vibration effects, some electronic devices use an actuator, such as an Eccentric Rotating Mass ("ERM") actuator in which an eccentric mass is moved by a motor, a Linear Resonant Actuator ("LRA") in which a mass attached to a spring is driven back and forth, or an actuator using a "smart material" such as piezoelectric material, electro-active polymers, or shape memory alloys.

SUMMARY

One aspect of the embodiments herein relates to a haptic actuator comprising a housing, a first electromagnet, a moveable mass, a second electromagnet, and a third electromagnet. The first electromagnet is fixed to the housing and configured to have magnetic poles that are aligned with a first axis and that are at first and second ends of the first electromagnet. The moveable mass is disposed within the housing and at least partially surrounds the first electromagnet. The moveable mass has i) ferromagnetic material at a first end of the moveable mass, and ferromagnetic material at a second end of the moveable mass opposite the first end of the moveable mass, where the first axis passes through the first and second ends of the moveable mass, and ii) a plurality of permanent magnets that are configured to magnetize the ferromagnetic material at the first and second ends of the moveable mass, such that when a current is applied to the first electromagnet, the ferromagnetic material at one of the first and second ends is attracted to the first electromagnet, and the ferromagnetic material at the other of the first and second ends is repelled by the first electromagnet. The second electromagnet is fixed to the housing and configured to have magnetic poles aligned with the first axis. The third electromagnet is fixed to the housing and configured to have magnetic poles aligned with the first axis. The second electromagnet and the third electromagnet face respective opposite ends of the moveable mass, such that the first end of the moveable mass is between the first electromagnet and one of the second electromagnet and the third electromagnet, and the second end of the moveable mass is between the first electromagnet and the other of the second electromagnet and the third electromagnet.

In an embodiment, the second electromagnet and the third electromagnet are fixed to, respectively, opposite first and second ends of the housing.

In an embodiment, the haptic actuator further comprises a controller configured to cause actuation of the moveable mass by providing a respective current to each of the first electromagnet, the second electromagnet, and the third electromagnet in a manner that causes the magnetic poles of the electromagnets to have the same polarity.

In an embodiment, each of the respective currents provided to the first, second, and third electromagnets by the controller to cause the actuation of the moveable mass have the same frequency and the same phase.

In an embodiment, the respective currents provided to the first, second, and third electromagnets by the controller to cause actuation of the moveable mass correspond to a resonant frequency of the moveable mass.

In an embodiment, the controller is configured to cause braking of the moveable mass by providing respective currents to the second electromagnet and the third electromagnet in a manner that causes the magnetic poles of the second electromagnet and the magnetic poles of the third electromagnet to have opposite polarities from each other.

In an embodiment, the respective currents provided by the controller to cause braking are currents that cause each of the second electromagnet and the third electromagnet to repel the moveable mass.

In an embodiment, the respective currents provided by the controller to cause braking include a first direct current provided to the second electromagnet and a second direct current provided to the third electromagnet, the first direct current being in an opposite direction from the second direct current.

In an embodiment, the plurality of permanent magnets comprises a first set of one or more permanent magnets adjacent to the first end of the moveable mass and having magnetic poles with a first polarity, and comprises a second set of one or more permanent magnets adjacent to the second end of the moveable mass and having magnetic poles with a second polarity opposite the first polarity.

In an embodiment, the haptic actuator is a solenoid resonant actuator (SRA).

In an embodiment, the moveable mass is shaped as a rectangular frame with a central opening there through.

Features, objects, and advantages of embodiments hereof will become apparent to those skilled in the art by reading the following detailed description where references will be made to the appended figures.

BRIEF DESCRIPTION OF THE DRAWINGS

The foregoing and other features and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIGS. 7A-7B and 8A-8B illustrate other cross-sectional views of the haptic actuator, according to an embodiment herein.

DETAILED DESCRIPTION

Figure 1A:
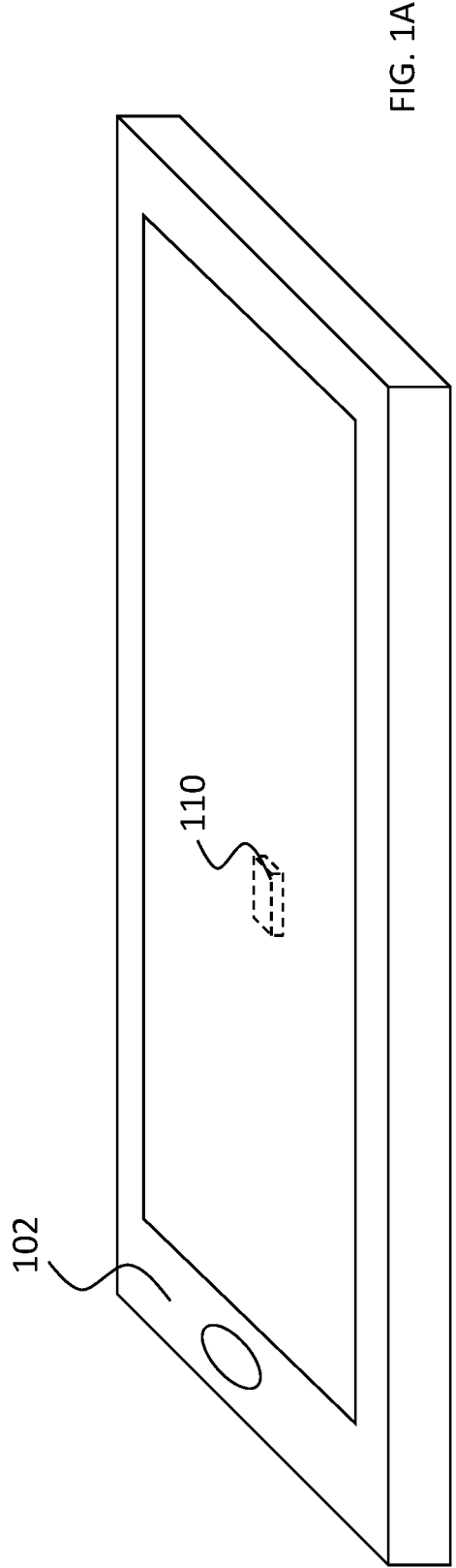
FIG. 1A is a perspective view of a mobile device that includes a haptic actuator of the embodiments herein.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments hereof relate to a haptic actuator that uses a plurality of electromagnets to improve acceleration in the actuator, provide braking of unwanted vibrations in the actuator, and improve the frequency range of the actuator. In some instances, the haptic actuator may be used as a high definition (HD) actuator. An HD actuator may be, for example, an actuator which can output higher frequency content, such as a high-frequency vibration for a haptic effect. Such high-frequency haptic effects may be useful in gaming (e.g., virtual reality gaming), mobile, wearable, automotive, computing, and other applications. Those haptic effects may be considered richer or more life-like. In an example, an HD actuator may be able to output high-frequency content with a faster ramp-up time and larger dynamic range. In some cases, the HD actuator may act as a high fidelity actuator, which may be, e.g., an actuator configured to only generate a haptic effect of a pre-defined resolution or higher. In an example, some types of ERM or LRA type actuators may be considered "low definition" actuators if they have a limited frequency range or strength when generating haptic effects.

In some instances, the haptic actuator may be a solenoid resonating actuator (SRA). The SRA may use an electromagnet that is stationary relative to the actuator housing, and the electromagnet may actuate a moveable mass that moves relative to the actuator housing. The SRA may exhibit better dynamic performance than an ERM or LRA type actuator. The electromagnets in the SRA may include a coil wrapped around a ferromagnetic core. In SRA design, increased vibration amplitudes may be achieved by increased sizes of the moveable mass. This may limit the need to increase the size of the coil and ferromagnetic core of the electromagnet, which may limit the use of expensive materials, such as of copper coils, in the actuator.

Some embodiments of the haptic actuator herein are SRAs that are used as HD actuators. To be used as a HD actuator, the SRA may need to reduce unwanted vibrations and to have a good wideband frequency response. The wideband frequency response may be affected by the amount of force that can be exerted on the moveable mass. The unwanted vibrations may result from a moveable mass that continues to oscillate or otherwise vibrate even after a drive signal has been stopped. This type of vibration, sometimes referred to as an oscillatory tail, may prevent a haptic effect from having a crisp feeling. Embodiments hereof relate to providing a haptic actuator, such as a SRA, that places first and second electromagnets to face opposite sides (more generally, opposite ends) of the moveable mass. These two electromagnets may act in concert with another, middle or third electromagnet that is at least partially enclosed by the moveable mass. For example, the electromagnets may act in concert to actuate the moveable mass in the same direction, thus increasing the net force and acceleration on the moveable mass. Thus, embodiments of the actuator herein include at least three electromagnets, in which one electromagnet is, e.g., in a center of the housing and at least partially enclosed by the moveable mass, and the other two electromagnets are outside of the moveable mass, facing respective opposite ends of the moveable mass. This arrangement of the electromagnets may also provide both a pull force and a push force at each end of the moveable mass, thus balancing the types of forces exerted at the two opposite ends of the moveable mass. In some cases, the electromagnets may be aligned so that a substantially linear magnetic field forms in the gap between the electromagnets. The linear magnetic field may exert a constant force regardless of a position of the moveable mass in the gap. The increased acceleration, the ability to exert a pull force and/or a push force on both ends of the moveable mass, and/or linear magnetic field may improve the wide band frequency response and fidelity of the haptic actuator.

In some instances, the electromagnets placed at the opposite ends of the moveable mass may be used to reduce the oscillatory tail of the actuator. For instance, they may be configured to exert opposing forces on the moveable mass to actuate it towards a neutral position. The opposing forces may thus act to dampen this oscillatory tail. This arrangement of the electromagnets and moveable mass thus provides improved acceleration, efficient braking, and wide band frequency response, while avoiding a significant increase to the size of the actuator or to its power consumption.

Figure 1B:
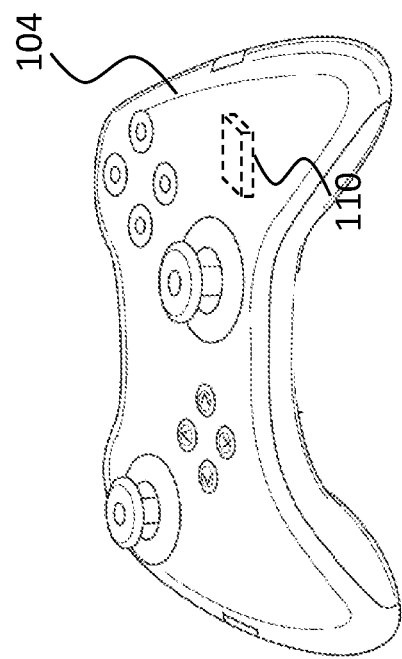
FIG. 1B is a perspective view of a game controller that includes a haptic actuator of the embodiments herein.

The haptic actuator in the embodiments hereof may be used in a variety of applications, including those involving gaming, mobile devices, wearables, automotives, computing, and other applications. For instance, FIGS. 1A and 1B illustrate various user interface devices that utilize a haptic actuator in accordance with embodiments hereof. FIG. 1A illustrates a mobile phone 102 that includes a haptic actuator 110, while FIG. 1B illustrates a game controller 104 that includes the haptic actuator 110. In an example, the haptic actuator 110 may be a body actuator configured to generate a vibrotactile or other type of haptic effect at the user interface device 102/104 of FIGS. 1A and 1B.

Figure 2A:
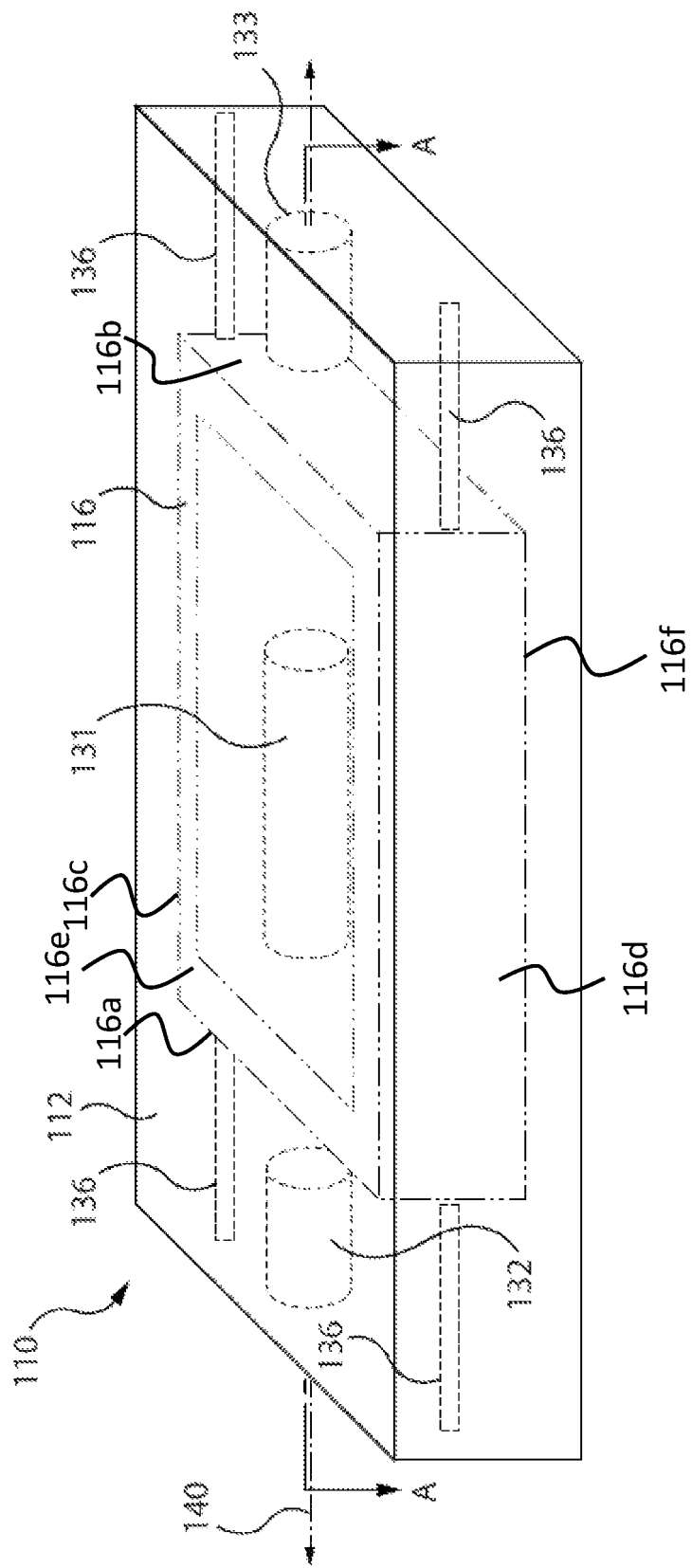
FIG. 2A is a perspective view of a haptic actuator, according to an embodiment herein.

FIG. 2A illustrates a perspective view of an example haptic actuator 110. In an embodiment, the haptic actuator 110 may be a solenoid resonant actuator (SRA). The actuator 110 may include a housing 112 (e.g., a sheet metal housing), a moveable mass 116 suspended in the housing, and a plurality of electromagnets, such as a first electromagnet 131, a second electromagnet 132, and a third electromagnet 133. The first, second, and third electromagnets 131, 132, and 133 may be aligned along a first axis 140. They may have a cylindrical, rectangular, or any other shape. In some instances, the electromagnets 131, 132, and 133 may be fixed (e.g., directly or indirectly attached) to the housing 112 of the actuator 110 (e.g., fixed to a floor or ceiling of the housing), and may actuate the moveable mass 116 along the first axis 140 (e.g., cause the moveable mass 116 to vibrate back and forth along the axis). Because the three electromagnets are fixed directly or indirectly to the housing, the moveable mass 116 may be moveable relative to the three electromagnets. In one example, the first electromagnet 131 may be fixed to a floor or ceiling of the housing 112, while the second electromagnet 132 and the third electromagnet 133 are also fixed to the floor or ceiling of the housing 112, and/or are fixed to two respective opposite internal side surfaces of the housing 112. The opposite internal side surfaces may be at opposite ends of the housing 112. In some cases, the second electromagnet 132 and the third electromagnet 133 may be located closer to a center of the housing 112. For instance, the two electromagnets may be fixed to a floor of the housing 112, and may be placed so that there is a distance between each of the electromagnets 132, 133 and a respective internal surface of the two opposite internal surfaces described above.

In some cases, the moveable mass 116 may be suspended via one or more springs 136 in the housing 112. The springs 136 may be made from, e.g., spring steel. The springs may form a suspension that allows the moveable mass 116 to "float" in the housing 112, and to move along the first axis 140. In an embodiment, the material which is used to suspend the moveable mass 116 may include one or more of spring steel, plastic, rubber (e.g., silicone rubber or Buna-N rubber), nylon, or some other material. In an embodiment, the material may be attached to the moveable mass 116 at surfaces 116a, 116b which face the second electromagnet 132 and the third electromagnet 133, respectively, as shown in FIG. 2A. In an embodiment, the material may alternatively or additionally be attached to other surfaces of the moveable mass 116, such as to at least two surfaces of surfaces 116c-116f. FIG. 2A shows a moveable mass 116 that has the form of a hollow rectangular structure that at least partially surrounds the first electromagnet 131. In an embodiment, the rectangular structure may have the form of a frame having a central opening there through. In another embodiment, the moveable mass 116 may have a different shape, such as a shell having a semi-circular cross-section (see FIGS. 7B and 8B), or any other shape.

In an embodiment, each of the first, second, and third electromagnets 131, 132, 133 may comprise a coil (e.g., copper coil) wrapped around a ferromagnetic core, such as a metal rod (e.g., iron rod). In some instances, one or more of the electromagnets may include a coil with no ferromagnetic core. When an electric current (e.g., AC or DC current) is passed through the coil of one of the electromagnets, the respective electromagnet may create a temporary magnetic field in the electromagnet. This magnetic field may be canceled by stopping the current, or may be reversed in direction by reversing the direction of the current. The magnetic poles of the electromagnet may thus also be reversed in polarity by reversing the current. When the current is an AC current, the polarity of the magnetic poles may switch at a rate that corresponds to the frequency of the AC current. In an embodiment, the magnetic poles of each of electromagnet 131, 132, and 133 may be aligned with the first axis 140.

Figure 2B:
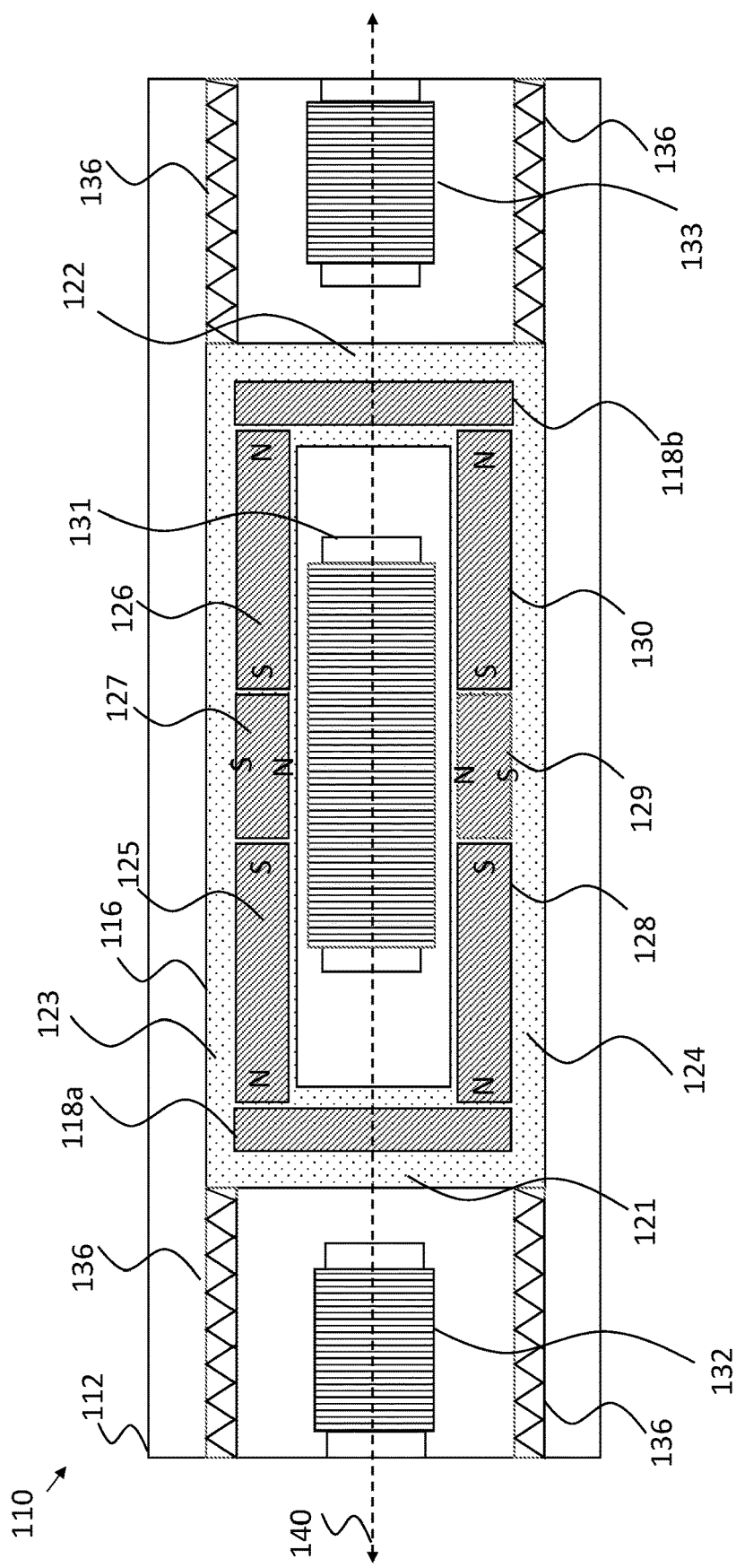
FIG. 2B is a sectional view of a haptic actuator, according to an embodiment herein.

A sectional view of the haptic actuator 110, along the arrow in FIG. 2A, is shown in FIG. 2B. In the embodiment shown in FIGS. 2A-2B, the moveable mass 116 may be a rectangular frame-shaped structure, which defines a central opening or an enclosure, having a first pair of parallel walls that form two respective opposite sides or ends (e.g., a first end 121 and second end 122) of the moveable mass 116. The rectangular frame-shaped structure may further have a second pair of parallel walls that are orthogonal to the first pair of parallel walls. The second pair of parallel walls may form two other respective opposite sides of ends (e.g., third end 123 and fourth end 124) of the moveable mass 116. The first pair of walls and the second pair of walls may have the same thickness, or may have different thicknesses. The dimension of the walls in the direction of the arrow A of FIG. 2A may be less than, the same as, or greater than the dimension (e.g., diameter) of any of the three electromagnets 131, 132, 133 in the direction of the arrow A.

In FIGS. 2A and 2B, the rectangular frame-shaped structure may also be described as surrounding the central opening (e.g., cut-out portion) at its center, for placement of the first electromagnet 131 therein. The central opening may also be rectangular in shape, or may have any other shape. When the moveable mass is at rest, the first electromagnet 131 may be located at a center of the central opening. The central opening may have a size that allows the moveable mass 116 to move within an expected range of motion without touching the first electromagnet 131.

The moveable mass includes ferromagnetic material and a plurality of permanent magnets. In some instances, the body of the moveable mass, including the walls described above, is made from the ferromagnetic material. In some instances, the ferromagnetic material forms a discrete component of the moveable mass, and may be disposed within the walls. In FIG. 2B, the ferromagnetic material includes ferromagnetic material 118a (e.g., an iron plate) that is within or forms the wall at a first end 121 of the moveable mass 116, and ferromagnetic material 118b that is within or forms the wall at a second end 122 of the moveable mass, where the second end 122 may be described herein as being opposite the first end 121 of the moveable mass 116. The first end 121 and the second end 122 may be aligned along the first axis 140, such that the first axis 140 passes through the first and second ends 121, 122. In an embodiment, the moveable mass 116 may be comprised of only permanent magnets, (i.e., the ferromagnetic material is permanently magnetized). In an embodiment, the moveable mass may include only ferromagnetic material. In an embodiment, the moveable mass includes ferromagnetic material and additional material which is not ferromagnetic material. In an embodiment, the moveable mass 116 includes no electromagnet.

In an embodiment, the permanent magnets include permanent magnets 125, 126, and 127 that form or are embedded within the wall at the third end 123 of the moveable mass, and permanent magnets 128, 129, and 130 that form or are embedded within the wall at the fourth end 124 of the moveable mass. The plurality of permanent magnets 125, 126, 128, and 130 may be configured to magnetize the ferromagnetic material 118a and 118b, and the permanent magnets 127 and 129 may be used to separate the permanent magnets 125, 128 from the permanent magnets 126, 130.

In FIG. 2B, the permanent magnets 125 and 128 may form a first set of one or more magnets adjacent to the first end 121 and having a first polarity of magnetic poles. The permanent magnets 126 and 130 may form a second set of one or more permanent magnets adjacent to the second end 122 and having a second polarity of magnetic poles that are opposite to the first polarity. In some instances, the permanent magnets 127 and 129 may form a third set of one or more permanent magnets located between the first set and the second set of one or more permanent magnets, and may have magnetic poles with a polarity that is orthogonal to the first polarity and the second polarity.

In an embodiment, while FIG. 2B shows six separate permanent magnets and ferromagnetic material located at two opposite ends of the moveable mass 116, other embodiments may have a different combination of permanent magnets and ferromagnetic material, such as more or fewer permanent magnets (e.g., only four permanent magnets), or more or fewer locations having ferromagnetic material, or any combination thereof.

Figure 3:
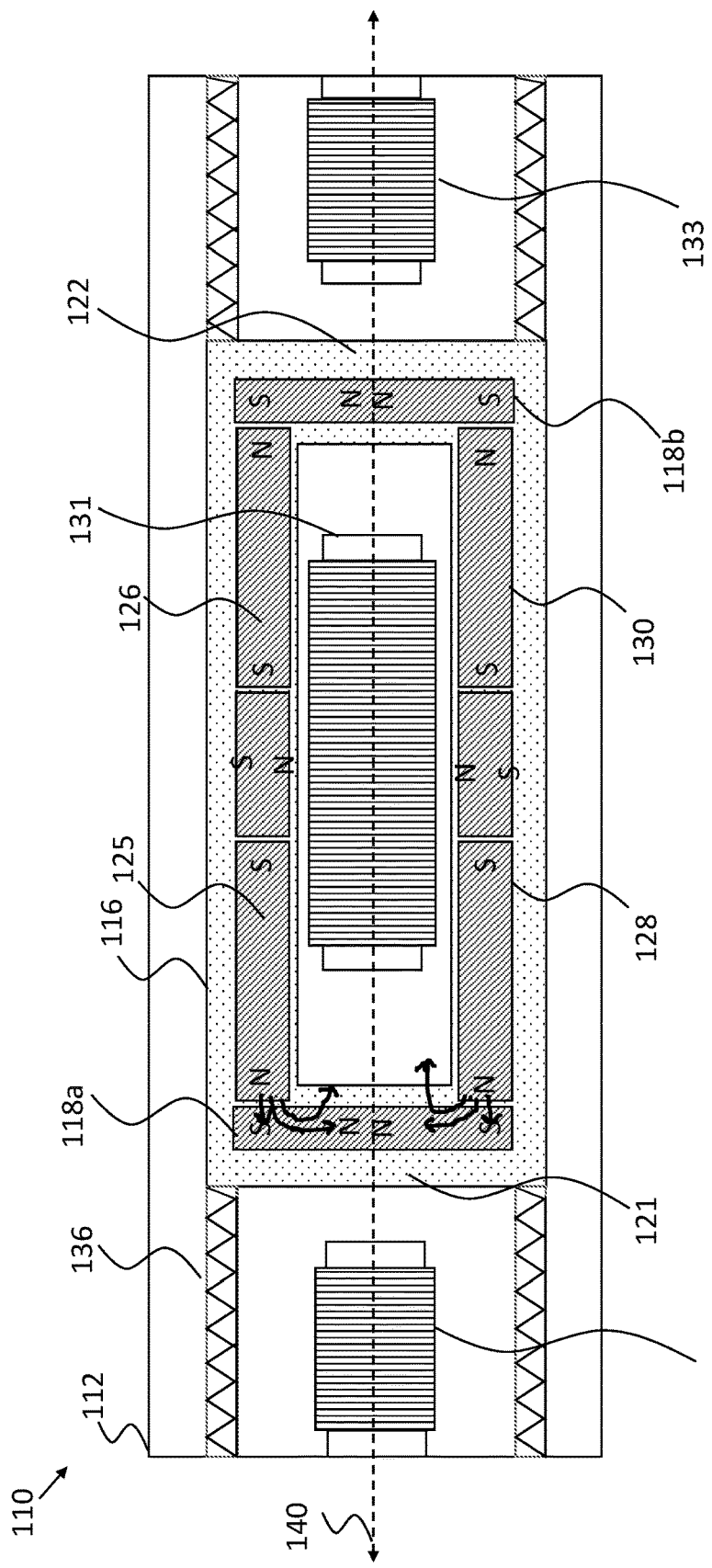
FIG. 3 is a sectional view of a haptic actuator, according to an embodiment herein.

In an embodiment, the plurality of permanent magnets 125, 126, 128, and 130 in the moveable mass 116 may be configured to magnetize the ferromagnetic material 118a, 118b, as illustrated in FIG. 3. In the figure, respective end of each permanent magnet 125, 128 may be adjacent to ferromagnetic material 118a at the first end 121 of the moveable mass 116. In some instances, the ferromagnetic material may be located at a pole (e.g., north pole or south pole) of the permanent magnet, and have a plane which is orthogonal to the north-south axis of the permanent magnet. The permanent magnets 125 and 128 may be oriented such that their magnetic poles are parallel with the first axis 140. Similarly, as shown in FIG. 2B, permanent magnets 126 and 130 may be adjacent to the ferromagnetic material 118b at the second end 122 of the moveable mass.

Figure 4:
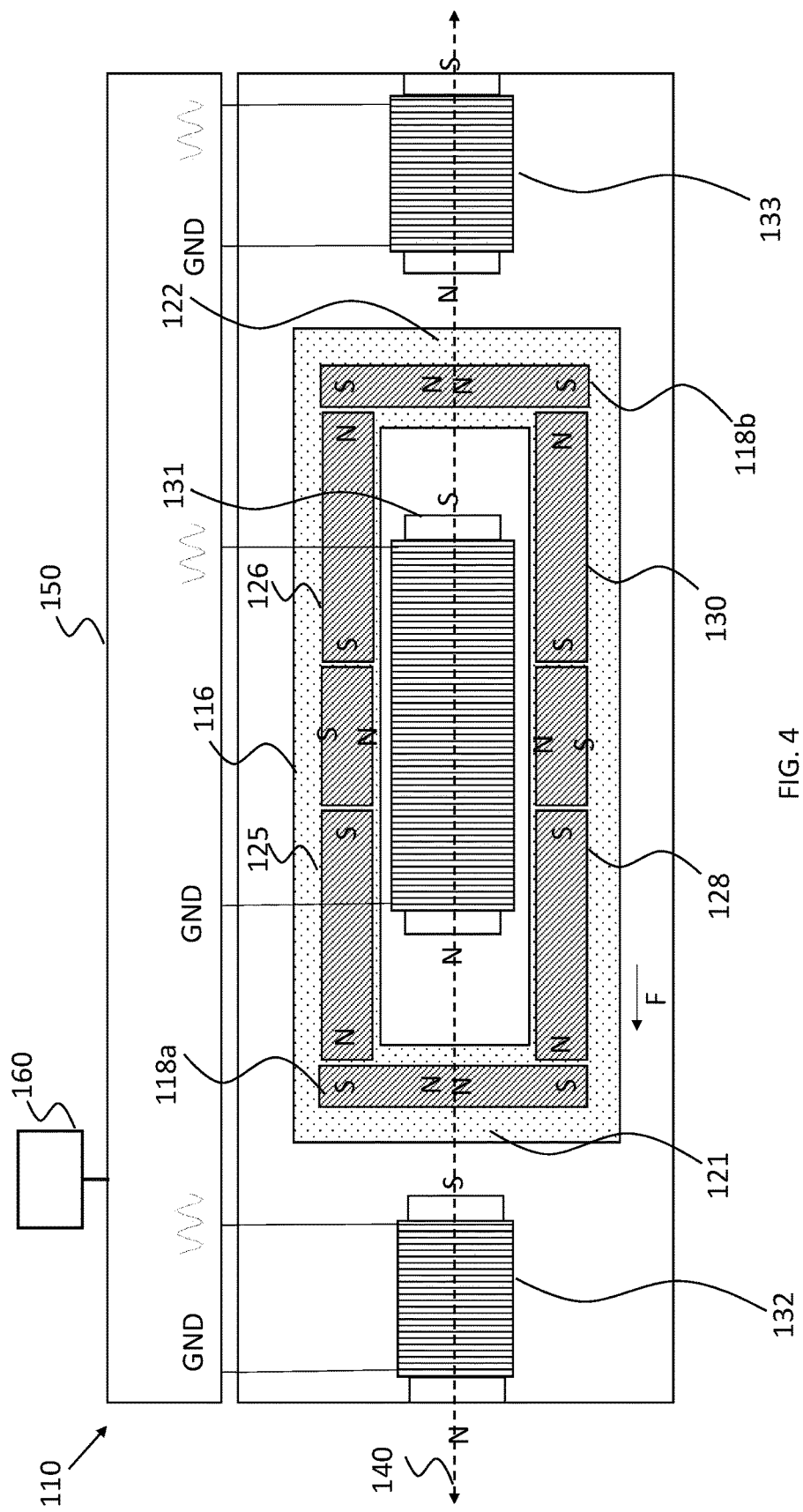
FIG. 4 provides a sectional view of a haptic actuator and a block diagram of a controller and current source, according to an embodiment herein

In an embodiment, the permanent magnets may be configured to magnetize the ferromagnetic material at the first and second ends of the moveable mass such that when a current is applied to the first electromagnet, the ferromagnetic material at one of the first or second ends (e.g., the second end) is attracted to the first electromagnet, and the ferromagnetic material at the other of the first and second ends (e.g., the first end) is repelled by the first electromagnet. As illustrated in FIGS. 3 and 4, the ferromagnetic material 118a or 118b may be magnetized by the permanent magnets such that the north pole of the ferromagnetic material is at a center of the ferromagnetic material.

The magnetization of the ferromagnetic material allows the moveable mass to be actuated by magnetic fields generated by the electromagnets 131, 132, and 133. FIG. 4 shows the electromagnets 131, 132, and 133 generating magnetic poles by receiving AC currents. FIG. 4 shows their magnetic poles at an instance in time (e.g., $t=t_1$). At $t=t_1$, the north pole of the first electromagnet 131 faces the north pole of the ferromagnetic material 118a at the first end 121 of the moveable mass 116. The south pole of the first electromagnet 131 faces the north pole of the ferromagnetic material 118b at the second end 122. Thus, the second end 122 of the moveable mass may be attracted to the first electromagnet 131, while the first end 121 of the moveable mass may be repelled by the first electromagnet 131. As a result, the moveable mass 116 may experience a force F pointing in the direction of the arrow shown in FIG. 4, and may be actuated in that direction. At a later time (e.g., $t=t_2$) the magnetic poles of the electromagnets shown in FIG. 4 may reverse in polarity as the AC current reverses in direction. Thus, the AC current may cause the force to reverse in direction at a later time (e.g., at $t=t_2$) due to reversal of the polarity of the magnetic poles of the electromagnet 131. As a result, applying the AC current may cause the moveable mass 116 to move back and forth (e.g., to vibrate) along the first axis 140. In one example, the AC current may have a frequency that is a resonant frequency of the actuator.

Figure 5:
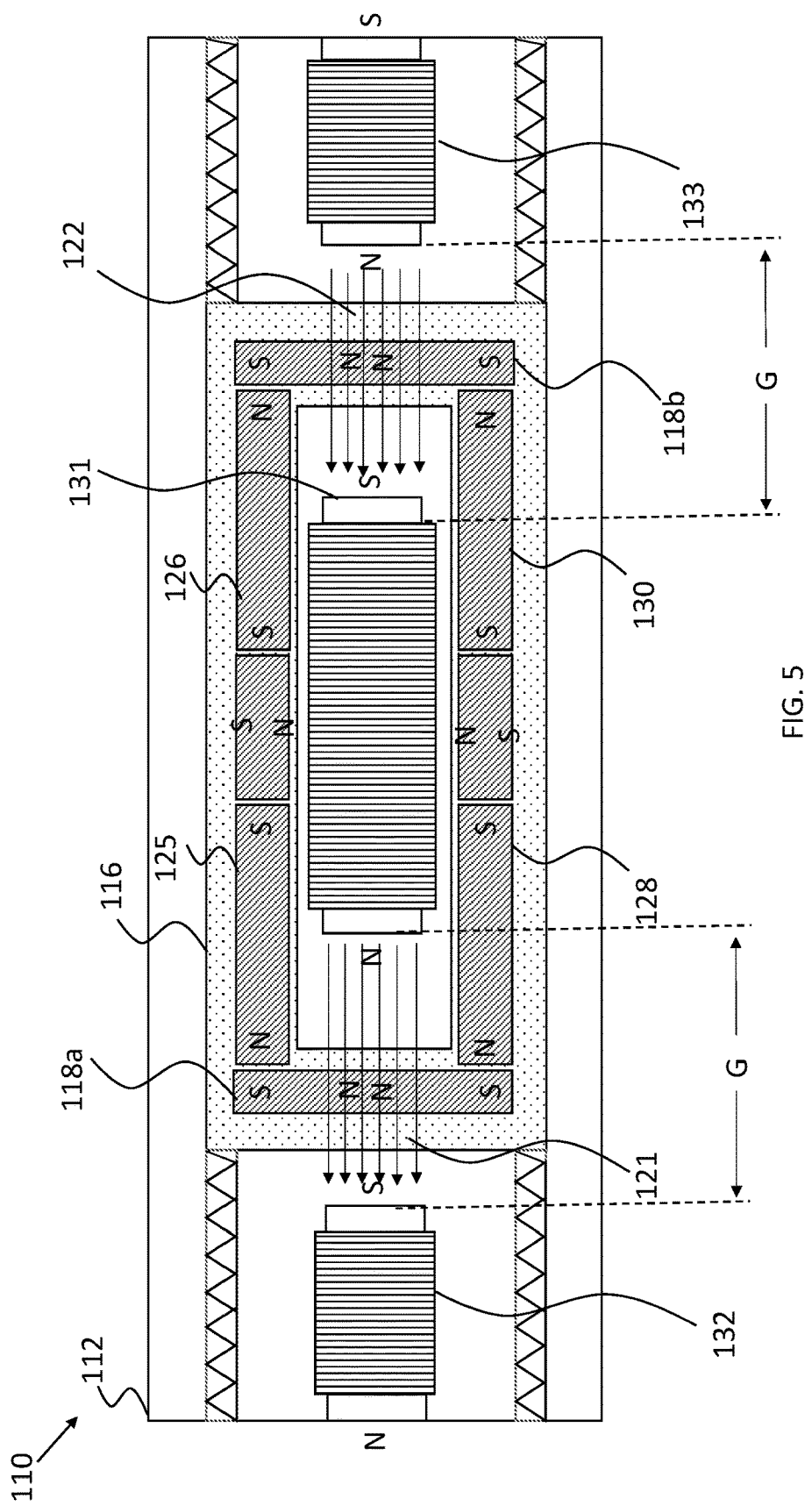
FIG. 5 is a sectional view of a haptic actuator, according to an embodiment herein.

As shown in the figures, the moveable mass 116 may be placed between the second electromagnet 132 and the third electromagnet 133. In this arrangement, the first end 121 of the moveable mass may be between the first electromagnet 131 and the second electromagnet 132, while the second end 122 of the moveable mass may be between the first electromagnet 131 and the third electromagnet 133. As shown in FIG. 4, both electromagnets 132 and 133 may also receive an AC current and generate magnetic poles. The currents applied to the electromagnets 131, 132, and 133 during actuation may cause their magnetic poles to have the same polarity. This may be achieved, for example, by concurrently passing a respective AC current with the same frequency and phase to each of the three electromagnets 131, 132, 133. As shown in FIGS. 4 and 5, the magnetic poles of the three electromagnets may all be aligned along the first axis 140.

In the arrangement shown in FIGS. 4 and 5, the second electromagnet 132 and the third electromagnet 133 may exert additional force on the moveable mass 116, and improve the fidelity of any haptic effect generated by the actuator 110. For instance, the south pole of the second electromagnet 132 may exert a pulling force on the north pole of the ferromagnetic material 118a at the first end 121. This pulling force exerted by the second electromagnet 132 may augment the pushing force exerted by the first electromagnet 131 on the same first end 121. Additionally, the north pole of the third electromagnet 133 may exert a pushing force on the north pole of the ferromagnetic material 118b at the second end 122. This pushing force may augment the pulling force exerted by the first electromagnet 131 on the same second end 122. The second and third electromagnets 132, 133 thus can augment the forces exerted by the first electromagnet 131 on the moveable mass 116. The three electromagnets can thus be used to provide improved acceleration for the haptic actuator 110, such as an acceleration value of 2G, 5G, 10G, or some other acceleration value.

Further, in an embodiment, the second and third electromagnets 132, 133 can be used to provide high fidelity haptic effects by providing improved control over the forces exerted on the moveable mass 116, and/or by providing braking against unwanted vibrations in the actuator 110. In some instances, when the electromagnet 131 repels ferromagnetic material at an end of the moveable mass, the magnitude of the pushing force from the electromagnet 131 alone may be difficult to predict, because the interaction between the ferromagnetic material and the electromagnet's magnetic field at that end may be harder to calculate. Thus, the relationship between a driving signal and the resulting force arising from the magnetic repulsion may be harder to estimate. In an embodiment, the presence of the second electromagnet 132 may address this issue by creating a substantially linear magnetic field with the first electromagnet 131 in a gap "G", separation or area between the two electromagnets, as illustrated in FIG. 5. As a result, the ferromagnetic material 118a in this gap may experience a constant force regardless of its position in the gap. This interaction between the two electromagnets may lead to a simpler relationship between the driving signal and the force exerted at the first end 121 of the movable mass 116, and to higher fidelity of haptic effects provided by the haptic actuator 110. Additionally, the pulling force exerted by the second electromagnet 132 on the first end 121 may be more effective than the pushing force exerted by the first electromagnet 131 at that end, thus contributing to the overall force exerted on the moveable mass 116 and to a better frequency response for the haptic actuator 110.

Figure 6:
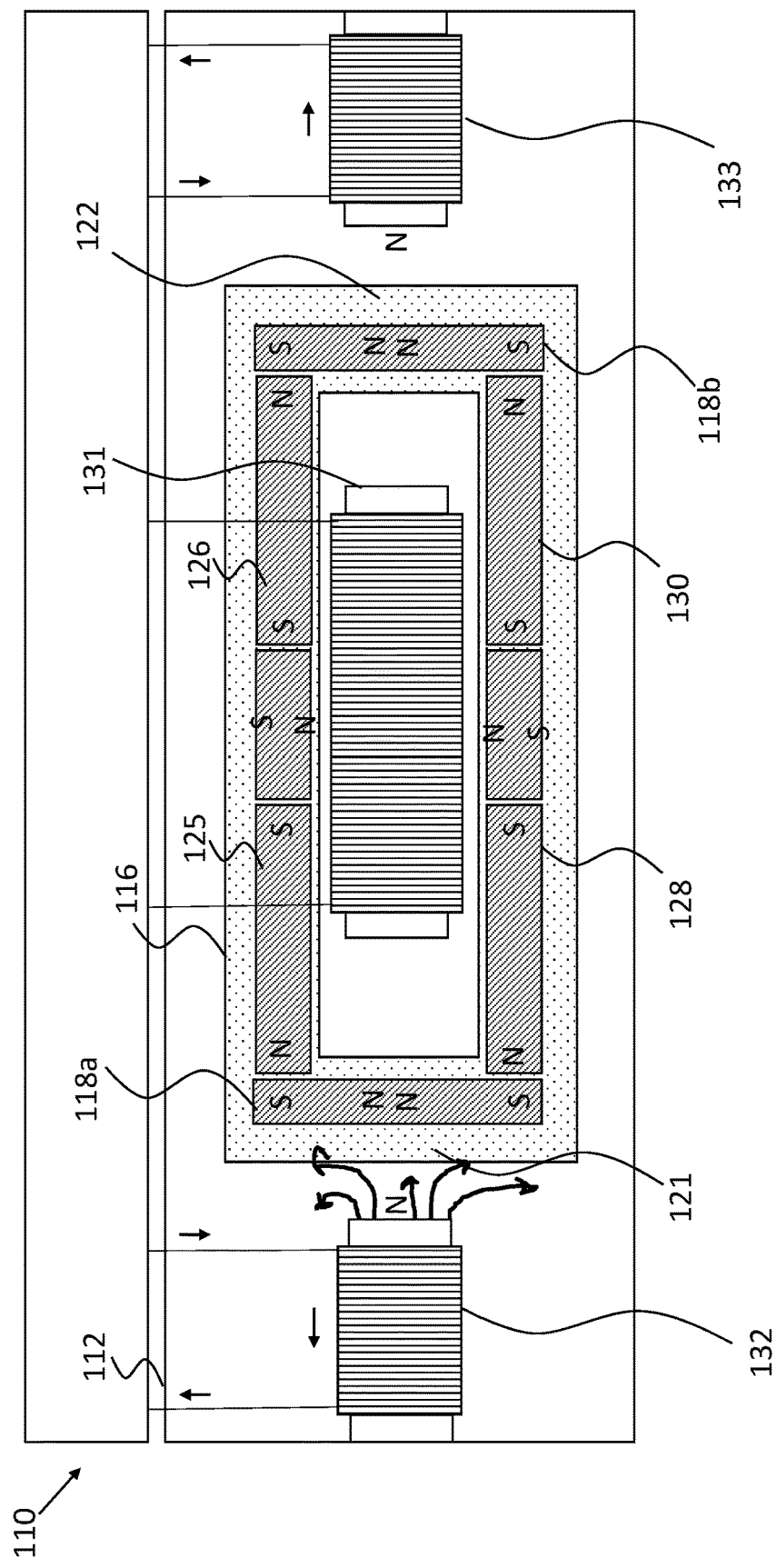
FIG. 6 is a sectional view of a haptic actuator and a block diagram of a controller and current source, according to an embodiment herein.

In an embodiment, the second electromagnet 132 and the third electromagnet 133 may be used to brake movement (e.g., unwanted vibrations) of the moveable mass 116 in the actuator 110. For instance, they may be configured to both exert a pushing force on the moveable mass 116 at the same time, to push the moveable mass 116 to a neutral position. In some cases, a DC current may be applied to the second and third electromagnets 132, 133 to achieve the braking functionality. In FIG. 6, a DC current is applied to the second electromagnet 132, and another DC current is applied to the third electromagnet 133. The two DC currents may have opposite directions, so that the two electromagnets have magnetic poles with opposite polarities. In this configuration, both electromagnets 132, 133 may generate a north pole facing a respective north pole of ferromagnetic material in the moveable mass 116. As a result, both electromagnets 132, 133 may push the moveable mass 116 toward a neutral position such as a centered position within the housing 112. These pushing forces toward the neutral position may dampen out unwanted vibrations (e.g., the oscillatory tail) of the moveable mass 116.

In an embodiment, the DC currents may have directions which cause both electromagnets 132, 133 to pull on the moveable mass 116 at the same time. For example, both electromagnets 132, 133 may be configured to generate a south pole facing a respective north pole of the moveable mass 116. In some instances, however, configuring both of the electromagnets 132, 133 to push on the moveable mass may be preferable to configuring both electromagnets to pull on the moveable mass. This is because even if the pushing force from, e.g., the second electromagnet 132 on the moveable mass is slightly greater than the pushing force from the third electromagnet 133, this disparity decreases as the moveable mass is pushed farther away from the second electromagnet 132. Eventually, the moveable mass is pushed to a point at which the pushing forces balance, or the pushing force from the third electromagnet 133 becomes greater. As a result, the moveable mass is pushed towards a neutral position at which the pushing forces balance (e.g., a centered position in the housing 112). When both electromagnets instead are pulling on the moveable mass in opposite directions, if the pulling force from, e.g., the second electromagnet 132 is slightly greater than the pulling force from the third electromagnet 133, this disparity may instead increase as the moveable mass is further pulled closer to the second electromagnet 133. As a result, the moveable mass is pulled away from a neutral position at which the pulling forces balance each other (e.g., away from a centered position in the housing 112). In an embodiment, one or more AC currents may be used to create a braking effect. For example, a first AC current may be provided to the first electromagnet 131 to drive the moveable mass 116. To brake the moveable mass, a second AC current and a third AC current that each have the same frequency as the first AC current and are each 180 degrees out of phase with the first AC current may be applied to the second electromagnet 132 and the third electromagnet 133, respectively. The second AC current and the third AC current may be applied at the same time that a portion of the first AC current is being applied, or the second AC current and the third AC current may be applied when the first AC current has stopped, or after the first AC current has stopped.

In an embodiment, the first, second, and third electromagnets 131, 132, 133 may have the same size. In an embodiment, the first electromagnet 131 may be longer (e.g., have more turns of coil) than the second electromagnet 132 and/or the third electromagnet 133. For instance, each of the second electromagnet 132 and the third electromagnet 133 may have a coil with a length that is substantially half or less than half of a length of the coil of the first electromagnet 131. More generally speaking, each of the second electromagnet 132 and the third electromagnet may have a length that is substantially half or less than half of a length of the first electromagnet 131. In some cases, the first electromagnet 131 may be configured to generate a stronger magnetic field than the second electromagnet 132 and/or the third electromagnet 133. For instance, each of the second electromagnet 132 and the third electromagnet 133 may be configured to create a magnetic field when any current having a first amplitude is provided to the respective electromagnet of the second electromagnet 132 and the third electromagnet 133, and the magnetic field may have a strength that is substantially half of a strength of a magnetic field created by the first electromagnet 131 when any current having the first amplitude is provided to the first electromagnet 131. In an embodiment, the first electromagnet 131, the second electromagnet 132, and the third electromagnet 132 are configured to create an acceleration on the moveable mass that is between 0.5 G and 3 G. For example, if the moveable mass being accelerated were between 100 mg and 200 mg, the three electromagnets may be configured to exert a combined force of between 0.5 N and 6 N on the moveable mass.

In an embodiment, a controller 150 that controls a current source 160 may be a processor that is separate from the haptic actuator 110, or may be integrated into the haptic actuator 110. For example, it may be part of a processing circuit (e.g., microprocessor, ASIC, FPGA, PGA) on user interface device 102, 104, a dedicated haptics controller located outside the actuator 110, or an integrated haptics controller inside the haptic actuator 110. Functionality of the controller 150 may be implemented in hardware and/or software (e.g., through one or more computer-executable instructions stored on a tangible, non-transitory computer readable medium). In an embodiment, current source 160 may be a general purpose power source for the user interface device 102, 104, or a dedicated power source for generating haptics effects, or any other power source.

In an embodiment, the controller 150 may be a haptics controller configured to execute a method for generating haptic feedback with a haptic actuator. The method may be executed, for instance, in hardware and/or through software (e.g., through executing one or more computer-executable instructions stored on a non-transitory computer readable medium). The haptic actuator in the method may have one or more features described above. For instance, the actuator may have i) a housing, ii) a first electromagnet fixed to the housing, and iii) a moveable mass suspended in the housing and at least partially surrounding the first electromagnet, with ferromagnetic material at a first end of the moveable mass and ferromagnetic material at a second end of the moveable mass opposite the first end of the moveable mass, and a plurality of permanent magnets that are configured to magnetize the ferromagnetic material of the first end and of the second end of the moveable mass. The haptic actuator in the method may further have iv) a second electromagnet fixed to the housing, and v) a third electromagnet fixed to the housing, wherein the second electromagnet and the third electromagnet face opposite ends of the moveable mass.

In an embodiment, the method may include a step in which the haptic controller determines that a haptic effect is to be generated with the haptic actuator. The haptic controller may then cause AC currents having the same frequency and phase to be applied to the first electromagnet, the second electromagnet, and the third electromagnet, so as to cause movement in the moveable mass. The haptic controller may then stop the AC currents. After or at the same time as the AC currents are stopped, the haptic controller may cause DC currents having different directions to be applied to the second electromagnet and the third electromagnet to dampen any remaining movement of the moveable mass.

As discussed above, the moveable mass 116 may have any shape, such as a rectangular shape or a shell having a semi-circular cross-section. These two example shapes may have a space (e.g., enclosure, cavity) in which an electromagnet such as the first electromagnet 131 can be placed. This space may be large enough to provide room for the moveable mass 116 to move with an expected range of motion without colliding with the electromagnet 131 in the cavity. These two example shapes are illustrated by cross-sectional views in FIGS. 7A and 7B (taken along a line A-A) and FIGS. 8A and 8B (taken along a line B-B). FIG. 7A shows an example in which the moveable mass 116 has the shape of a rectangular frame or enclosure, with permanent magnets (e.g., 125 and 128) on both sides of the enclosure. The cross-sectional view further shows the moveable mass 116 floating in the housing 112. The moveable mass 116 may be suspended by springs, as shown in FIGS. 2A and 2B. The first electromagnet 131, shown in a dashed outline, is located further back in the housing and is fixed to a floor thereof.

FIG. 7B shows a moveable mass 116B which has the shape of a shell with a semi-circular cross section. In this instance, the cross-sectional view shows a single permanent magnet 125 having a cylindrical shape, for magnetizing the ferromagnetic material at an end of the moveable mass 116. In both FIGS. 7A and 7B, the first electromagnet 131 is shown to be indirectly fixed to a floor of the housing 112 via a base structure 170.

Figure 8B:
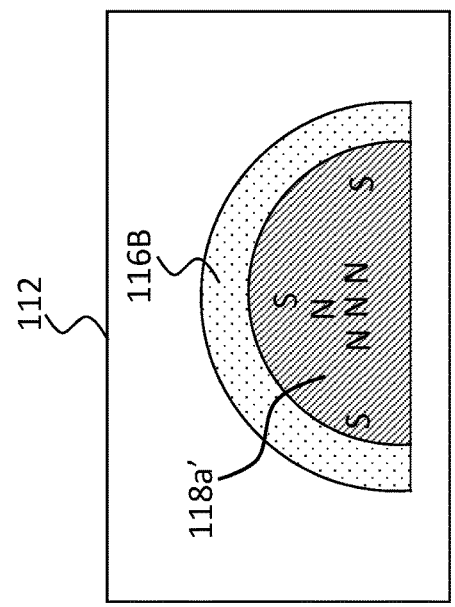
Figure 8A:
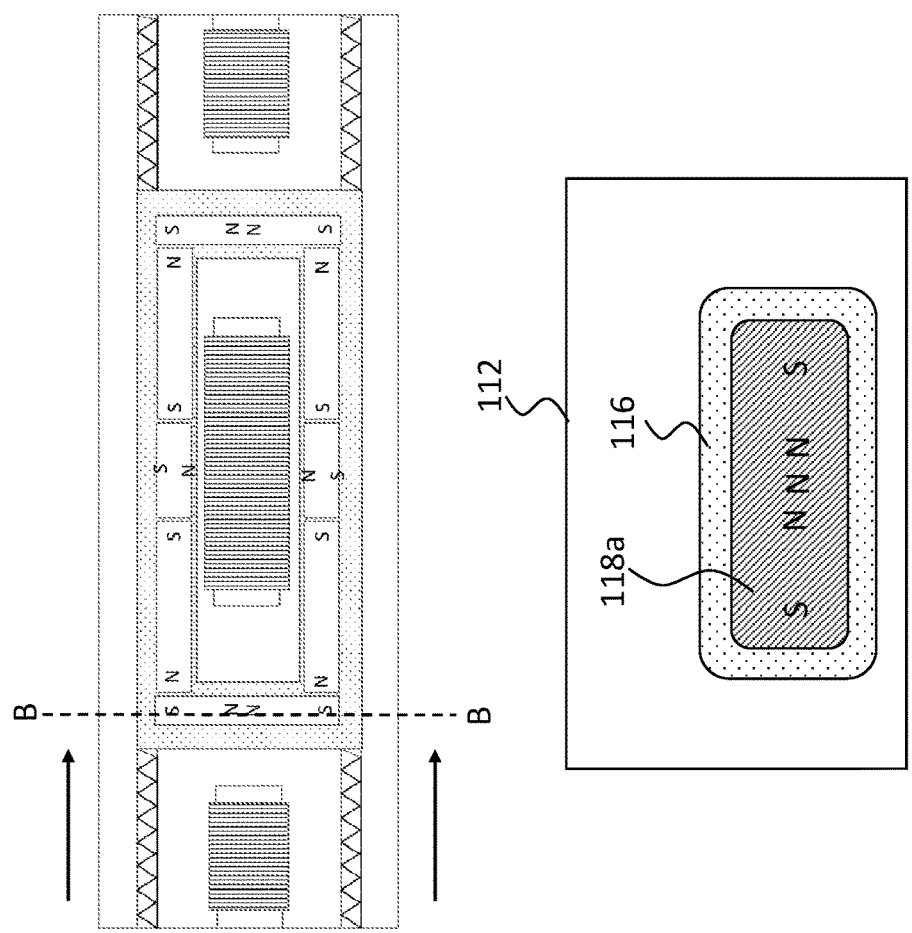

FIGS. 8A and 8B show cross-sectional views of the ferromagnetic material 118a/118a' at an end 121 of the moveable mass 116. In the embodiment of FIG. 8A, the ferromagnetic material 118a may have the shape of a rectangular plate. In the embodiment of FIG. 8B, the ferromagnetic material 118a' may have the shape of a semicircular plate. Both figures show the ferromagnetic material being magnetized so as to have a north pole at its center.

While various embodiments have been described above, it should be understood that they have been presented only as illustrations and examples of the present invention, and not by way of limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A haptic actuator, comprising:
a housing;
a first electromagnet fixed to the housing and configured to have magnetic poles that are aligned with a first axis and that are at first and second ends of the first electromagnet;
a moveable mass disposed within the housing and at least partially surrounding the first electromagnet, the moveable mass having,
  i) ferromagnetic material at a first end of the moveable mass, and ferromagnetic material at a second end of the moveable mass opposite the first end of the moveable mass, wherein the first axis passes through the first and second ends of the moveable mass, and
  ii) a plurality of permanent magnets that are configured to magnetize the ferromagnetic material at the first and second ends of the moveable mass, such that when a current is applied to the first electromagnet, the ferromagnetic material at one of the first and second ends is attracted to the first electromagnet, and the ferromagnetic material at the other of the first and second ends is repelled by the first electromagnet;
a second electromagnet fixed to the housing and configured to have magnetic poles aligned with the first axis; and
a third electromagnet fixed to the housing and configured to have magnetic poles aligned with the first axis,
wherein the second electromagnet and the third electromagnet are facing respective opposite ends of the moveable mass, such that the first end of the moveable mass is between the first electromagnet and one of the second electromagnet and the third electromagnet, and the second end of the moveable mass is between the first electromagnet and the other of the second electromagnet and the third electromagnet.

2. The haptic actuator of claim 1, wherein the second electromagnet and the third electromagnet are fixed to, respectively, opposite first and second ends of the housing.

3. The haptic actuator of claim 2, further comprising: a controller configured to cause actuation of the moveable mass by providing a respective current to each of the first electromagnet, the second electromagnet, and the third electromagnet in a manner that causes the magnetic poles of the electromagnets to have a same polarity.

4. The haptic actuator of claim 3, wherein the respective currents provided to the first, second, and third electromagnets by the controller to cause the actuation of the moveable mass have a same frequency and a same phase.

5. The haptic actuator of claim 4, wherein the respective currents provided to the first, second, and third electromagnets by the controller to cause actuation of the moveable mass correspond to a resonant frequency of the moveable mass.

6. The haptic actuator of claim 3, wherein the controller is configured to cause braking of the moveable mass by providing respective currents to the second electromagnet and the third electromagnet in a manner that causes the magnetic poles of the second electromagnet and the magnetic poles of the third electromagnet to have opposite polarities from each other.

7. The haptic actuator of claim 6, wherein the respective currents provided by the controller to cause braking are currents that cause each of the second electromagnet and the third electromagnet to repel the moveable mass.

8. The haptic actuator of claim 7, wherein the respective currents provided by the controller to cause braking include a first direct current provided to the second electromagnet and a second direct current provided to the third electromagnet, the first direct current being in an opposite direction from the second direct current.

9. The haptic actuator of claim 1, wherein the housing comprises a spring that suspends the moveable mass within the housing.

10. The haptic actuator of claim 1, wherein the plurality of permanent magnets comprises a first set of one or more permanent magnets adjacent to the first end of the moveable mass and having magnetic poles with a first polarity, and comprises a second set of one or more permanent magnets adjacent to the second end of the moveable mass and having magnetic poles with a second polarity opposite the first polarity.

11. The haptic actuator of claim 10, further comprising a third set of one or more permanent magnets located between the first set and the second set of one or more permanent magnets, the one or more magnets of the third set having magnetic poles with a polarity that is orthogonal to the first polarity and to the second polarity.

12. The haptic actuator of claim 1, wherein the haptic actuator is a solenoid resonant actuator (SRA).

13. The haptic actuator of claim 1, wherein each of the second electromagnet and the third electromagnet is configured to create a magnetic field when any current having a first amplitude is provided to the respective electromagnet of the second electromagnet and the third electromagnet, the magnetic field having a strength which is substantially half of a strength of a magnetic field created by the first electromagnet when any current having the first amplitude is provided to the first electromagnet.

14. The haptic actuator of claim 13, wherein each of the first, second, and third electromagnets comprises a coil wrapped around a ferromagnetic core, wherein each of the second electromagnet and the third electromagnet has a coil with a length that is substantially half of a length of the coil of the first electromagnet.

15. The haptic actuator of claim 1, wherein the moveable mass is shaped as a rectangular frame with a central opening there through.

16. The haptic actuator of claim 15, wherein the moveable mass comprises a first pair of walls that are parallel to each other, and comprises a second pair of walls that are parallel to each other and orthogonal to the walls of the first pair of walls, wherein the first pair of walls and the second pair of walls at least partially surround the central opening in which the first electromagnet is located, and wherein the ferromagnetic material at the first end and the second ends of the moveable mass are embedded in, or form, the first pair of walls, and the plurality of permanent magnets are embedded in, or form, the second pair of walls.

* * * * *